United States Patent Office 2,983,731
Patented May 9, 1961

2,983,731
CONDENSATION PRODUCT OF CARBAZOLE WITH ALPHA-METHYL-STYRENE

Helmut Meis and Hubert Sauer, Letmathe, Germany, assignors to Rütgerswerke-Aktiengesellschaft, Frankfurt am Main, Germany
No Drawing. Filed Aug. 26, 1955, Ser. No. 530,906
Claims priority, application Germany June 6, 1953
1 Claim. (Cl. 260—315)

This invention relates to novel condensation products and it has particular relation to condensation products formed by the reaction of aromatic vinyl compounds with diphenylene compounds. The invention also relates to a method of preparing such condensation products.

It has been known that compounds which contain aromatic ring systems and are activated by one or more —OH groups, such as phenols, are capable of condensation with aromatic vinyl compounds in the presence of acids or acid-forming catalysts or in the presence of surface-active inorganic substances such as bleaching earths.

It has now been found that certain diphenyl derivatives, i.e. the so-called diphenylene compounds can be likewise easily reacted with aromatic vinyl compounds in the presence of surface-active inorganic substances, such as bleaching earths, which serve as condensation catalysts.

In these diphenylene compounds, the hydrogen atoms which are in o,o'-position relative to the connecting link of the two benzene rings, are substituted by a divalent atom such as oxygen or sulfur, or by a divalent atom group such as the —NH—, —CO—, —CH$_2$—, or —CH=CH— group. As examples of such diphenylene compounds the following are mentioned: diphenylene oxide, diphenylene sulfide, carbazol, fluorene, fluorenone, phenanthrene and their derivatives, e.g. 9-(N)-methyl carbazol or 9-(N)-ethyl-carbazol. Furthermore, diphenylene derivatives in which either one benzene ring or both benzene rings are substituted by condensed ring systems such as 2,3-benzdiphenylene oxide or 2,3-benzofluorene can also be used.

As an example of the vinyl compounds adapted to be used in carrying out the present invention, styrene and its derivatives, e.g. alpha-methyl styrene, which are preferred, and vinyl naphthalene are mentioned.

In carrying out the present invention, substitution products of the diphenylene compounds are formed, for example in the case of styrene 1-phenyl-1-ethyl derivatives and in the condensation with alpha-methyl styrene 1-phenyl-isopropyl derivatives.

As mentioned above, surface-active inorganic substances, primarily those which are commercially available as bleaching earths, can be used as condensation catalysts. Naturally occurring bleaching earths, as well as artificial or synthetic bleaching earths can be used in carrying out the invention. Such bleaching earths are described for example in the monographs "Oskar Kausch: Das Kieselsäuregel und die Bleicherden" and "Eckhart-Wirzmuller: Die Bleicherden, ihre Gewinnung und Verwendung." In carrying out the invention the bleaching earths are used preferably in an amount of 1 to 15% by weight based on the weight of the diphenylene compound.

It is preferred to carry out the invention in the presence of solvents which simplify further processing of the reaction product formed. Such solvents are primarily aromatic hydrocarbons and chlorinated aliphatic solvents. As particularly suitable solvents toluene, xylene, cumene, and the like are mentioned.

In carrying out the invention, the diphenylene compound is dissolved in the selected solvent, for example carbazol is dissolved in cumene. To the solution the catalyst is added and the solution is then heated under stirring to about 70° to 90° C. Or the solution containing the carbazol solution is first heated to 70°–90° C. and the catalyst is added to the solution then. Subsequently, the aromatic vinyl compound is introduced, if necessary in dissolved condition, into the solution of diphenylene compounds. The rate of introduction of the vinyl compound can vary. According to a modification of the process, the ingredients, i.e. diphenylene compound, vinyl compound and the catalyst, are mixed with each other, the mixture is slowly heated to the necessary temperature and kept at this temperature until the reaction is completed. The hot solution is then separated from the catalyst by filtration. The reaction product can be recovered from the filtered solution in any suitable manner, for example by crystallization or by distillation after the removal of the solvent.

The products of the present invention can be used, for example, for the preparation of intermediate products for dyestuffs and pharmaceutical products as well as starting materials for rubber products and artificial materials and auxiliary products for textiles.

*Example 1*

84 parts of diphenylene oxide (½ mol) are dissolved in 200 parts of xylene. To this solution 10 parts of active bleaching earth, e.g. the bleaching earth known in commerce under the name "Bleichton G" are added and the solution is heated to 80° C. 118 parts of alpha-methyl styrene (1 mol) are then gradually introduced into the solution during two hours. After further heating to 80° C. for ½ hour, the solution is separated from the catalyst by filtration and the solvent is removed from the filtered solution by distillation. The residue solidifies upon cooling to a crystalline product which melts at 36° to 39° C. It can be purified by crystallization from methanol and the purified substance has a melting point of 40° C.

*Example 2*

83.5 parts of carbazol (½ mol) are dissolved in 400 parts of cumene at 80° C. and to the solution 10 parts of active bleaching earth, e.g. the bleaching earth known in commerce under the name "Tonsil AC" are added. 118 parts alpha-methyl styrene (1 mol) are now introduced dropwise into the solution during 3 hours, and the temperature of 80° C. is further maintained for an additional ½ hour. The hot reaction mixture is separated from the catalyst by filtration and permitted to cool to ordinary room temperature. Upon cooling, 180 parts of the reaction product separate by crystallization from the solution in form of needle-shaped colorless crystals. The latter are separated from the solvent by filtration and have a melting point of 170° to 175° C. The crystals can be purified by recrystallization from methanol and the purified substance has a melting point of 183° C.

*Example 3*

89 parts of phenanthrene (½ mol) are dissolved in 200 parts of xylene. To the solution 10 parts of active bleaching earth, e.g. the bleaching earth known in commerce under the name "Bleichton G" are added and the solution is heated to 80° C. 118 parts of alpha-methyl styrene (1 mol) are then introduced dropwise into the solution within 2½ hours under stirring and the temperature of 80° C. is further maintained for an additional ½ hour. The catalyst is then separated from the reaction mixture by filtration and the solvent is removed from the filtered solution by distillation. The residue is submitted to distillation in a vacuum of 5 mm. Hg at 165° to 170° C., whereby 200 parts of a colorless substance distill over, which crystallize after cooling upon standing. The crystallized product melts at 40° C. to 43° C. It can be purified by crystallization from methanol and has then a melting point of 45° C.

*Example 4*

84 parts of fluorene (½ mol) are dissolved in 200 parts of toluene and to the solution 10 parts of active bleaching earth, e.g. the bleaching earth known in commerce under the name "Bleichton G" are added. The solution is heated to 70° C. and 118 parts of alpha-ethyl styrene (1 mol) are introduced dropwise into the solution under stirring during 1 hour. After an additional ½ hour heating to 70° C. the catalyst is separated from the reaction mixture by filtration. From the filtered solution 100 parts of the solvent are removed by distillation and the residue is allowed to cool. Upon cooling, a crystallized paraffin-like product of slightly yellow coloration separates. The solvent is then removed by filtration, whereby a residue of 140 parts, which melts at 98° to 100° C. is obtained. The product can be purified by recrystallization from methanol and has then a melting point of 101° C.

*Example 5*

89.5 parts of phenanthrene (½ mol) are dissolved in 200 parts of xylene and to the solution 10 parts of bleaching earth, e.g. the bleaching earth known in commerce under the name "Bleichton G" are added. To the mixture, which is then heated to 70° C., 108 parts of styrene, (1 mol) are gradually added under stirring within 3 hours. Heating to 70° C. is continued for an additional ½ hour. The catalyst is then separated from the reaction mixture by filtration and the solvent is removed from the filtered solution by distillation. The residue can be distilled in a vacuum at 10 mm. Hg at 200° to 210° C. It is liquid at room temperature, but can be solidified by cooling it with a mixture of ice and sodium chloride.

*Example 6*

97.5 parts (½ mol) of 9(N)-ethylcarbazole (melting point 68° C.) are dissolved in 500 parts of cumene at boiling temperature of the latter and 15 parts of activated bleaching earth are added. 118 parts of α-methyl styrene (1 mol) are then gradually added dropwise during 4 hours under stirring. The hot solution is separated from the catalyst by filtration, the solvent is removed by distillation and the reaction product obtained as the residue is distilled under vacuo. After a slight amount of first runnings, 150 parts of an oil which distills under a vacuum of 11 mm. of Hg in the range of 290° and 310° C. and shows slight fluorescence, is obtained. After some standing, this oil solidifies to a crystalline substance having a melting point of 90°–98° C. It can be purified by recrystallization from methanol and yields 3,6-phenylisopropyl-9(N)-ethylcarbazole having a melting point of 111.5°–112.5° C. (uncorrected).

Although we do not want to limit ourselves by any theory, we believe that in carrying out the invention reaction between the diphenylene compound and the aromatic vinyl compound takes place e.g. according to the following scheme:

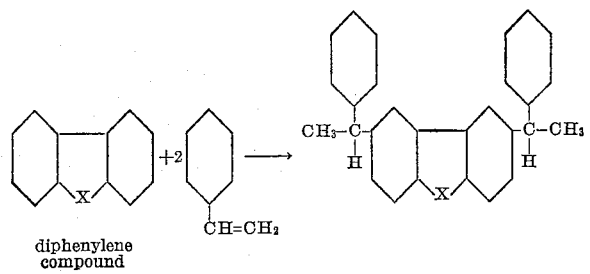

It has been found that substitution always takes place in the above indicated manner, i.e. in the 3 and 6 positions simultaneously.

It will be understood that this invention is not limited to the substances, proportions, solvents, temperatures and other conditions and/or details specifically described above and can be carried out with various modifications. For example, the diphenylene compound and the aromatic vinyl compound can be used in proportions other than those stated in the above examples. In carrying out the invention, it is preferred to use 2 mols of the vinyl compound for one mol of the diphenylene compound or derivative. Instead of the diphenylene compounds and the aromatic vinyl compounds described in the examples, other diphenylene compounds and/or other aromatic vinyl compounds can be used substantially in the above described manner. Furthermore, other bleaching earths can be substituted partly or entirely for the specific bleaching earths used in the above examples. The amount of the catalyst can be varied, preferably within the limits stated above. In addition to the solvents used in the above examples, other suitable solvents, such as carbon tetrachloride or other volatile organic solvents which are capable of dissolving the reactants and the condensation product, do not react with the starting materials or with the condensation product and are not affected by the reaction temperature, can be used. A homogeneous mixture of two or more solvents can also be used. A homogeneous mixture of two or more solvents can also be used. The preferred temperature range is 70°–90° C. The products of the invention are well defined chemical compounds, as shown particularly by their melting points.

The term "diphenylene compound" is used in the present application to denote and include a compound corresponding to the general formula

 (I)

wherein X stands for an atom or radical selected from the group consisting of —O—, —S—, —NH—, —CH$_2$—, —CO—, —CH=CH— and the term "diphenylene derivative" is used to denote and include substitution products of compounds of the above formula, e.g. 9-(N)-methyl carbazol, 9-(N)-ethyl carbazol, 2,3-benzdiphenylene oxide and 2,3-benzo-fluorene.

The term "aromatic vinyl compound" is used in the present application to denote and include compounds corresponding to the formula

W—CH=CH$_2$ wherein W stands for a monovalent aromatic radical, such as the benzene or naphthalene radical, and compounds of this type substituted by a lower alkyl group in the —CH=CH$_2$ radical.

The parts mentioned above are parts by weight if not otherwise stated.

As a specific example of the above mentioned uses of the products embodying the present invention it is mentioned that the product prepared according to the above Example 2 can be used as a non-hardening age resister for rubber. This product can also be used for the preparation of dyes, e.g. a dye analogous to hydron blue. Furthermore, the product obtained according to the above example can be condensed with aldehydes, particularly formaldehyde, to form synthetic resins.

Reference is made to our co-pending application Serial

No. 432,947, filed in our names on May 27, 1954, now abandoned, of which this is a continuation-in-part.

What is claimed is:

As a new compound, the condensation product of carbazol and alpha-methylstyrene, having a melting point of 183° C. said compound corresponding to the structural formula

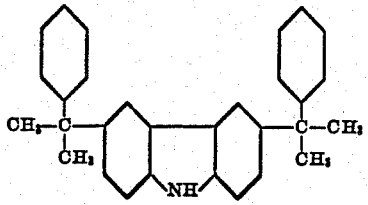

References Cited in the file of this patent

UNITED STATES PATENTS

| | | |
|---|---|---|
| 1,972,232 | Michel | Sept. 4, 1934 |
| 2,111,126 | Rabe | Mar. 15, 1938 |
| 2,281,252 | Smith et al. | Apr. 28, 1942 |
| 2,527,223 | Kern | Oct. 24, 1950 |
| 2,533,207 | Dickey et al. | Dec. 12, 1950 |

OTHER REFERENCES

Jr. Chem. Soc. (London) (1944), page 387.
Beilstein: vol. V, 4th ed., Main work, pages 720–722.
Elsevier's Encyclopedia of Org. Chem., vol. 13, pages 29–33.